(12) United States Patent
Inagaki et al.

(10) Patent No.: US 8,524,411 B2
(45) Date of Patent: Sep. 3, 2013

(54) NONAQUEOUS-ELECTROLYTE BATTERY AND BATTERY ASSEMBLY

(75) Inventors: Hiroki Inagaki, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 417 days.

(21) Appl. No.: 12/366,914

(22) Filed: Feb. 6, 2009

(65) Prior Publication Data

US 2009/0202892 A1 Aug. 13, 2009

(30) Foreign Application Priority Data

Feb. 7, 2008 (JP) ................................. 2008-027859

(51) Int. Cl.
*H01M 8/24* (2006.01)
*H01M 8/08* (2006.01)

(52) U.S. Cl.
USPC .......................................... 429/452; 429/498

(58) Field of Classification Search
USPC .................................................. 429/452, 498
See application file for complete search history.

(56) References Cited

U.S. PATENT DOCUMENTS

| | | | | |
|---|---|---|---|---|
| 4,284,692 A | * | 8/1981 | Rao et al. ...................... | 429/335 |
| 5,487,959 A | * | 1/1996 | Koksbang ..................... | 429/310 |
| 5,783,331 A | * | 7/1998 | Inoue et al. ................... | 429/217 |
| 5,792,575 A | * | 8/1998 | Naoi et al. .................... | 429/213 |
| 6,235,427 B1 | * | 5/2001 | Idota et al. ................... | 429/218.1 |
| 6,371,995 B1 | * | 4/2002 | Yasunami ..................... | 29/623.1 |
| 6,379,846 B1 | * | 4/2002 | Terahara et al. .............. | 429/344 |
| 6,395,423 B1 | * | 5/2002 | Kawakami et al. ........... | 429/215 |
| 6,432,585 B1 | * | 8/2002 | Kawakami et al. ........... | 429/233 |
| 6,534,220 B2 | * | 3/2003 | Garbe ............................ | 429/342 |
| 6,924,061 B1 | * | 8/2005 | Jow et al. ...................... | 429/199 |
| 7,833,677 B2 | * | 11/2010 | Kishi et al. ................... | 429/498 |
| 7,932,464 B2 | * | 4/2011 | Ryan ............................. | 136/263 |
| 2002/0015894 A1 | * | 2/2002 | Wariishi et al. .............. | 429/314 |
| 2002/0025477 A1 | * | 2/2002 | Itagaki et al. ................ | 429/328 |
| 2002/0031701 A1 | * | 3/2002 | Kawakami et al. ........... | 429/137 |
| 2002/0114993 A1 | * | 8/2002 | Miyaki et al. ................ | 429/137 |
| 2002/0122980 A1 | * | 9/2002 | Fleischer et al. ............. | 429/213 |
| 2003/0228521 A1 | * | 12/2003 | Hayase et al. ................ | 429/303 |
| 2004/0076883 A1 | * | 4/2004 | Aoshima et al. ............. | 429/223 |
| 2004/0126668 A1 | * | 7/2004 | Nishimura et al. ........... | 429/317 |
| 2006/0035137 A1 | * | 2/2006 | Maruo et al. ................. | 429/46 |
| 2006/0068272 A1 | | 3/2006 | Takami et al. | |
| 2006/0216600 A1 | | 9/2006 | Inagaki et al. | |

(Continued)

FOREIGN PATENT DOCUMENTS

| | | |
|---|---|---|
| JP | 9-199179 | 7/1997 |
| JP | 09199179 A * | 7/1997 |
| JP | 2005-135775 | 5/2005 |
| JP | 3866740 | 10/2006 |

OTHER PUBLICATIONS

U.S. Appl. No. 12/512,540, filed Jul. 30, 2009, Inagaki, et al.

(Continued)

*Primary Examiner* — Liam Heincer
(74) *Attorney, Agent, or Firm* — Oblon, Spivak, McClelland, Maier & Neustadt, L.L.P.

(57) ABSTRACT

A nonaqueous-electrolyte battery has a positive electrode 3 including a positive active material, a negative electrode 4 including a negative active material having a lithium insertion/release potential higher than 1.0 V (vs. Li/Li$^+$), and a nonaqueous electrolyte, wherein the nonaqueous electrolyte contains a compound having pyridine groups and a compound having one or more silyl groups.

13 Claims, 6 Drawing Sheets

(56) References Cited

U.S. PATENT DOCUMENTS

| | | | |
|---|---|---|---|
| 2006/0231525 A1* | 10/2006 | Asakawa et al. | 216/56 |
| 2006/0257746 A1 | 11/2006 | Inagaki et al. | |
| 2007/0009798 A1 | 1/2007 | Inagaki et al. | |
| 2007/0009801 A1* | 1/2007 | Inagaki et al. | 429/231.95 |
| 2007/0048610 A1* | 3/2007 | Tsang | 429/218.1 |
| 2007/0281209 A1* | 12/2007 | Kishi et al. | 429/188 |
| 2008/0019258 A1* | 1/2008 | Peters et al. | 369/275.1 |
| 2008/0166637 A1 | 7/2008 | Inagaki et al. | |
| 2008/0318132 A1* | 12/2008 | Visco et al. | 429/231.95 |
| 2009/0035646 A1* | 2/2009 | Mikhaylik et al. | 429/50 |
| 2009/0169955 A1* | 7/2009 | Uensal et al. | 429/33 |
| 2010/0040956 A1* | 2/2010 | Park | 429/342 |
| 2010/0092840 A1* | 4/2010 | Konno et al. | 429/40 |

OTHER PUBLICATIONS

U.S. Appl. No. 12/199,160, filed Aug. 27, 2008, Hiroki Inagaki, et al.
U.S. Appl. No. 13/181,211, filed Jul. 12, 2011, Inagaki, et al.

\* cited by examiner

NONAQUEOUS-ELECTROLYTE BATTERY AND BATTERY ASSEMBLY

CROSS-REFERENCE TO RELATED APPLICATIONS

This application is based upon and claims the benefit of priority from the prior Japanese Patent Application No. 2008-027859, filed on Feb. 7, 2008, the entire contents of which are incorporated herein by reference.

BACKGROUND OF THE INVENTION

1. Field

The present invention relates to a nonaqueous-electrolyte battery and a battery assembly employing the same.

2. Description of the Related Art

Nonaqueous-electrolyte batteries which are charged/discharged based on the movement of lithium ions between the negative electrode and positive electrode are being extensively investigated and developed as batteries having a high energy density. Nonaqueous-electrolyte batteries employing a lithium-transition metal composite oxide as a positive active material and a carbonaceous substance as a negative active material have already been commercialized. The lithium-transition metal composite oxide generally contains cobalt, manganese, nickel, or the like as the transition metal.

On the other hand, nonaqueous-electrolyte batteries employing a material having a higher lithium insertion/release potential than carbonaceous substances, such as, e.g., a lithium-titanium composite oxide (about 1.55 V vs. Li/Li$^+$), as a negative active material are being investigated in recent years (see, for example, Japanese Patent No. 3866740 and JP-A 9-199179 (KOKAI)). Lithium-titanium composite oxides change little in volume with charge/discharge and hence have excellent cycle characteristics. Such nonaqueous-electrolyte batteries are theoretically free from lithium metal deposition and can hence be charged at a high current.

In the case where a carbonaceous substance is used as a negative active material, a protective coating film (SEI: solid electrolyte interface) is formed on the surface of the negative electrode. This protective coating film is formed by the reductional decomposition of the electrolyte during the first charge. Although the coating film itself functions as a resistive ingredient to impair life characteristics, it has the effect of inhibiting the negative active material from excessively reacting with the electrolyte to thereby inhibit self-discharge. Consequently, for realizing satisfactory battery characteristics, it is necessary to form a protective coating film which has low resistance and is highly effective in inhibiting self-discharge. In order to accomplish such subject, investigations are being made on modifications of the protective coating film by adding various substances to electrolytes.

On the other hand, negative electrodes employing a lithium-titanium composite oxide are less apt to undergo the formation of a protective coating film thereon as compared with negative electrodes employing a carbonaceous substance. This is because the lithium-titanium composite oxide has a high lithium insertion/release potential and is less apt to reduce the electrolyte. It has been found that although negative electrodes employing a lithium-titanium composite oxide are less apt to be coated with a coating film and hence have low resistance, they are susceptible to self-discharge.

There has hence been a desire for a technique for forming a satisfactory protective coating film on the surface of a negative electrode to inhibit self-discharge without changing resistance even when the negative electrode employs a material having a high lithium insertion/release potential.

BRIEF SUMMARY OF THE INVENTION

The invention may provide a nonaqueous-electrolyte battery, including:
a case,
a positive electrode held in the case,
a negative electrode held in the case and including a negative active material which undergoes lithium insertion/release at a potential higher than 1.0 V, and
a nonaqueous electrolyte packed in the case,
the nonaqueous electrolyte including a nonaqueous solvent, an electrolyte material dissolved in the nonaqueous solvent, at least one compound containing at least either of general formula (1) and general formula (2) as a repeating unit, and at least one compound having one or more functional groups each represented by formula (3).

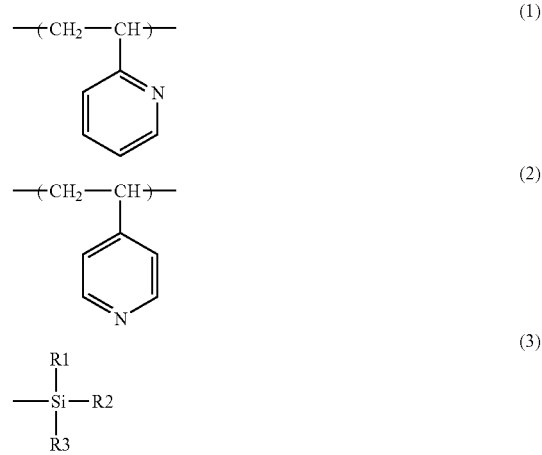

(In formula (3), R1 to R3 each independently represent an alkyl group having 1-10 carbon atoms, an alkenyl group having 2-10 carbon atoms, or an aryl group having 6-10 carbon atoms.)

According to the embodiments of the invention, a nonaqueous-electrolyte battery including a negative electrode employing a material having a high lithium insertion/release potential, such as, e.g., a lithium-titanium composite oxide, can be provided which can be inhibited from suffering self-discharge, does not increase in resistance, and has a long life.

DETAILED DESCRIPTION OF THE INVENTION

Figure 1:
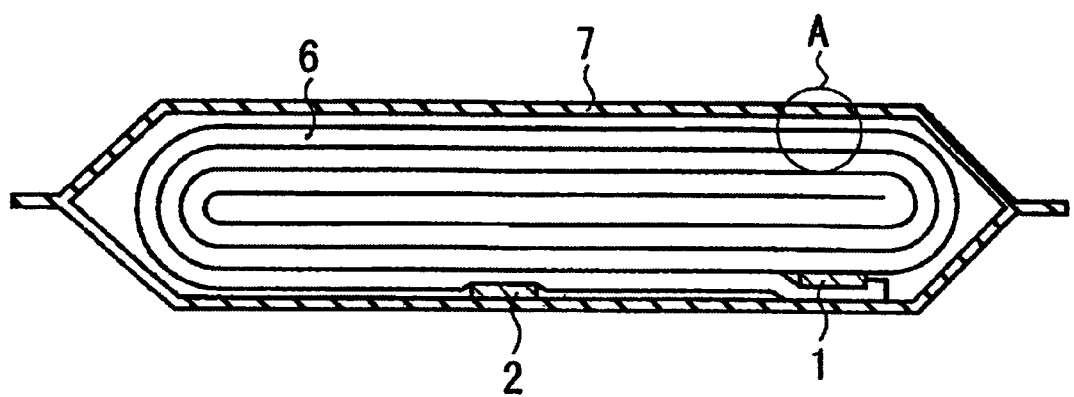
FIG. 1 is a diagrammatic sectional view of a flat type nonaqueous-electrolyte secondary battery according to an embodiment of the invention.

The present inventors diligently made investigations. As a result, they have found the following.

Lithium-titanium composite oxides have a lithium insertion/release potential of 1-2 V vs. Li/Li$^+$. Consequently, it is generally thought that to incorporate a substance having a reduction potential higher than that potential into an electrolyte may be preferable for forming a coating film on a negative electrode. However, it was ascertained that when certain kinds of substances which are reduced at a potential lower than the insertion/release potential of the negative electrode are added to the nonaqueous electrolyte, a dense and stable coating film is formed on the surface of the negative electrode. Namely, it has been found that when two substances, i.e., a compound having a structure including at least one of general formulae (1) and (2) as a repeating unit (hereinafter, referred to as "compound having pyridine groups") and a compound having one or more functional groups represented by general formula (3) (hereinafter, referred to a "compound having one or more silyl groups"), are caused to coexist, then a low-resistance stable coating film is formed which is not obtainable when the two compounds are independently incorporated. As a result, the inventors have succeeded in obtaining a battery which is reduced in self-discharge, does not increase in resistance, and has a long life.

This is thought to be because the two substances slightly react at 1-2 V vs. Li/Li$^+$, which is the insertion/release potential of the negative electrode, to form a dense and stable coating film on the surface of the negative electrode.

For example, poly(2-vinylpyridine), which has pyridine groups, and tris(trimethylsilyl)phosphate, which has silyl groups, have the following electrochemical properties. Poly (2-vinylpyridine) has a reduction peak at 0.9 V vs. Li/Li$^+$. However, it comes to slightly undergo reductional decomposition at around 2 V, and a reduction current can be observed. On the other hand, tris(trimethylsilyl)phosphate, which has silyl groups, has a reduction peak at 0.6 V vs. Li/Li$^+$, but a slight reduction current can be observed in this case also at potentials not lower than about 2 V. In this case, the compound having silyl groups undergoes slight reductional decomposition at a potential higher than the decomposition potential of the compound having pyridine groups. It is thought that when these two substances are added to the electrolyte, they competitively undergo a reaction in which each substance slightly undergoes reductional decomposition on the surface of the negative electrode during charge to form a coating film. A satisfactory coating film which has low resistance and can inhibit self-discharge is thought to be thus formed on the surface of the negative electrode.

It is important in this case that the compound having pyridine groups should be used in combination with the compound having silyl groups. In case where the compound having pyridine groups is added alone, a high-resistance coating film is formed disadvantageously. Although this high-resistance coating film can inhibit self-discharge, it increases resistance and impairs life characteristics. On the other hand, in case where the compound having silyl groups is added alone, a low-resistance coating film is formed but self-discharge is enhanced rather than diminished. It was thought that in the case of actually using the two compounds in combination, the values of resistance performance and self-discharge each were intermediate between the corresponding values in the case of separately using the compounds alone. However, as a result of an experiment, it was found that the better of the performances of the two compounds appears. It was rather ascertained that with respect to the effect of inhibiting self-discharge, better performance is exhibited than that obtained when the compound having pyridine groups is used alone. The reason for this is thought to be as follows. The compound having silyl groups acts on the negative electrode to form a thin and dense coating film before the compound having pyridine groups acts. The compound having pyridine groups is hence inhibited from reacting excessively.

Embodiments of the invention are explained below by reference to the drawings. In the embodiments, like members or parts are designated by like numerals or signs, and duplicates of explanation are omitted. The drawings are diagrammatic views for illustrating the embodiments of the invention and facilitating the understanding thereof. Although each drawing includes parts differing in shape, dimension, ratio, etc. from those in an actual device, the designs of such parts can be suitably modified while taking account of the following explanation and known techniques.

(First Embodiment)

Figure 2:
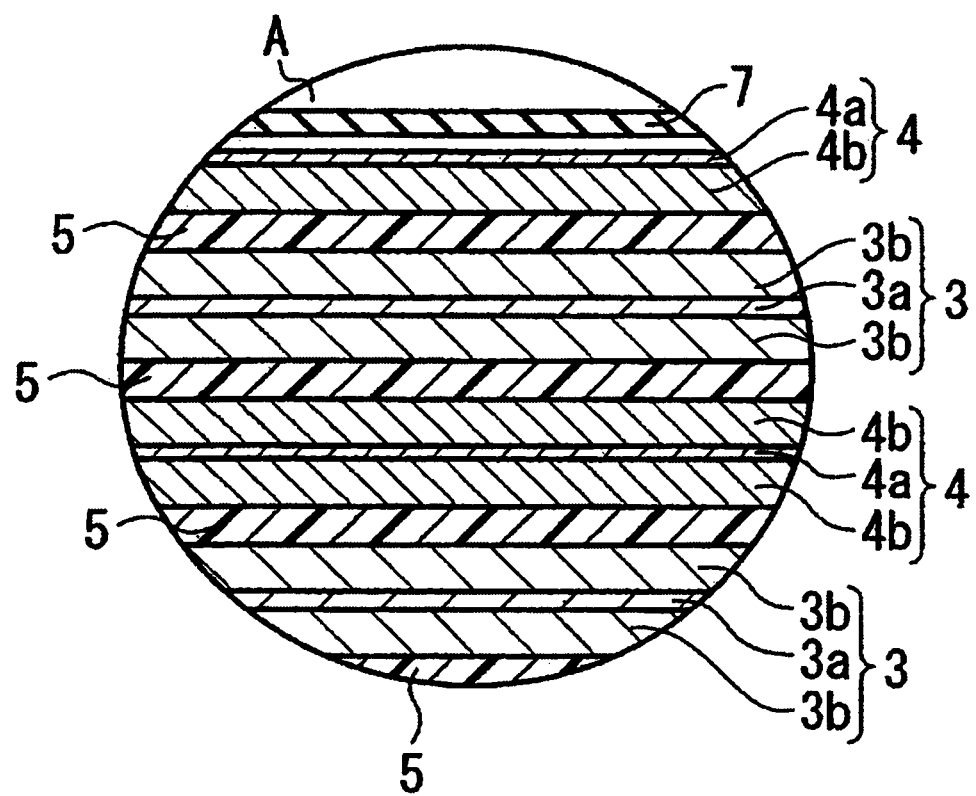
FIG. 2 is a diagrammatic sectional view showing in detail that part in FIG. 1 which is surrounded by the circle A.

The structure of a battery cell according to a first embodiment is explained by reference to FIG. 1 and FIG. 2. In FIG. 1 is shown a diagrammatic sectional view of a flat type nonaqueous-electrolyte secondary battery according to a first embodiment. FIG. 2 is a diagrammatic sectional view showing in detail that part in FIG. 1 which is surrounded by the circle A.

A positive electrode 3 has a positive-electrode terminal 1 bonded thereto, and a negative electrode 4 has a negative-electrode terminal 2 bonded thereto. The positive electrode 3 and the negative electrode 4 are wound through separators 5 to constitute flat wound electrodes 6. The wound electrodes 6 are packed in a case 7 filled with a nonaqueous electrolyte.

As shown in FIG. 1, the flat wound electrodes 6 are held in the case 7 filled with a nonaqueous electrolyte. In a part near the peripheral end of the wound electrodes 6, the negative-electrode terminal 2 and the positive-electrode terminal 1 are bonded on the outer side and inner side, respectively. The wound electrodes 6 have a multilayer constitution including the negative electrode 4, separator 5, positive electrode 3, and separator 5 stacked in this order from the outer side, although not shown in the figure.

The constitution of the wound electrodes 6 is explained in more detail. As shown in FIG. 2, the positive electrode 3 and the negative electrode 4 are disposed in a multilayer arrangement through separators 5. The negative electrode 4 in an outermost part thereof has a multilayer constitution including a negative-electrode current collector 4a and a negative-electrode layer 4b in this order from the outer side, while the other part of the negative electrode 4 has a multilayer constitution including a negative-electrode layer 4b, a negative-electrode current collector 4a, and a negative-electrode layer 4b in this order. The positive electrode 3 has a multilayer constitution including a positive-electrode layer 3b, a positive-electrode current collector 3a, and a positive-electrode layer 3b in this order.

The negative electrode, nonaqueous electrolyte, positive electrode, separators, case, positive-electrode terminal, and negative-electrode terminal are explained below in detail.

1) Negative Electrode

The negative electrode includes a negative active material which undergoes lithium insertion/release at a potential higher than 1.0 V vs. Li/Li$^+$.

In case where a substance which undergoes lithium insertion at a potential lower than the decomposition potential of that compound, e.g., a potential lower than 1.0 V (vs. Li/Li$^+$), such as, e.g., a carbonaceous substance, is used as a negative active material, application of the electrolyte according to the embodiments of the invention results in the excessive reduction/decomposition of the compound having pyridine groups or compound having one or more silyl groups contained in the electrolyte. As a result, an excessively high-resistance coating film is formed on the surface of the negative electrode to considerably reduce battery performances. In addition, the excessive decomposition reactions of those compounds themselves evolve a large amount of gases to deform the battery.

A preferred negative active material is a lithium-titanium composite oxide. Lithium-titanium composite oxides undergo lithium insertion at around 1-2 V (vs. Li/Li$^+$). Because of this, when the electrolyte according to the embodiments of the invention is used therewith, a stable coating film is formed on the surface of the negative electrode and this coating film does not increase resistance and attains an improvement in life characteristics and inhibition of self-discharge.

Examples of the lithium-titanium composite oxide include lithium-titanium oxides such as $Li_{4+x}Ti_5O_{12}$ ($0 \leq x \leq 3$) and $Li_{2+y}Ti_3O_7$ ($0 \leq y \leq 3$) and lithium-titanium composite oxides obtained by partly replacing the constituent elements of such lithium-titanium oxides with one or more other elements.

Furthermore, substances such as $TiO_2$ and a titanium composite oxide including titanium and at least one element selected from the group consisting of P, V, Sn, Cu, Ni, Co, and Fe are also usable as the negative electrode according to the embodiments of the invention. These substances undergo lithium insertion during the first charge to become lithium-titanium composite oxides.

The $TiO_2$ preferably is an anatase-form one which has undergone a heat treatment at a temperature of 300-500° C. and has low crystallinity. Examples of the metal composite oxide including titanium and at least one element selected from the group consisting of P, V, Sn, Cu, Ni, Co, and Fe include $TiO_2$—$P_2O_5$, $TiO_2$—$V_2O_5$, $TiO_2$—$P_2O_5$—$SnO_2$, and $TiO_2$—$P_2O_5$—MeO (Me is at least one element selected from the group consisting of Cu, Ni, Co, and Fe). This metal composite oxide preferably has a microstructure in which a crystalline phase and an amorphous phase coexist or an amorphous phase alone exists. Use of the metal composite oxide having such a microstructure can greatly improve cycle performance. Preferred of the substances shown above are the lithium-titanium oxides and the metal composite oxide including titanium and at least one element selected from the group consisting of P, V, Sn, Cu, Ni, Co, and Fe.

Besides the lithium-titanium composite oxide, examples of the negative active material include lithium-niobium composite oxides having a lithium insertion/release potential of 1-2 V (vs. Li/Li$^+$), such as $Li_xNb_2O_5$ and $Li_xNbO_3$, lithium-molybdenum composite oxides having a lithium insertion/release potential of 2-3 V (vs. Li/Li$^+$), such as $Li_xMoO_3$, and lithium-iron composite sulfides having a lithium insertion/release potential of 1.8 V (vs. Li/Li$^+$), such as $Li_xFeS_2$.

It is desirable that the negative active material should have an average particle diameter of 1 μm or smaller. However, too small average particle diameters thereof may result in a possibility that the nonaqueous electrolyte might be distributed mainly on the negative-electrode side and the positive electrode might become deficient in the electrolyte material. Consequently, the lower limit of the average particle diameter thereof is preferably 0.001 μm.

It is desirable that the negative active material should have an average particle diameter of 1 μm or smaller and a specific surface area as determined by the $N_2$ adsorption BET method in the range of 5-50 m$^2$/g. The infiltration of the nonaqueous electrolyte can hence be enhanced.

The negative electrode desirably has a pore diameter distribution, as determined by the method of mercury penetration, which has the two peaks described below.

<First Peak>

The pores which are reflected in the first peak mostly are pores formed by interstices among negative-electrode constituent elements such as the active-material particles, conductive material, and binder.

When the first peak of the pore diameter distribution of the negative electrode as determined by the method of mercury penetration has a modal diameter of 0.2 μm or smaller, the capillary infiltration of the nonaqueous electrolyte can be accelerated. The modal diameter thereof is simultaneously regulated preferably to 0.01 μm or larger for the following reason. On the surface of the negative active material or on the surface of the negative-electrode conductive material, by-products (organic or inorganic substances) generated by reactions with the electrolyte accumulate. In case where the first peak has a modal diameter smaller than 0.01 μm, the growth of such by-products closes pores and, hence, this negative electrode comes to have reduced liquid retentivity (nonaqueous-electrolyte retentivity), resulting in reduced cycle characteristics. Consequently, the modal diameter of the first peak is preferably in the range of 0.01-0.2 μm. A more preferred range thereof is 0.02-0.1 μm.

The volume of pores of 0.01-0.2 μm as determined by the method of mercury penetration may be 0.05-0.5 mL per g of the negative electrode (excluding the weight of the negative-electrode current collector). The reason why the weight of the negative-electrode current collector is excluded is explained first. As will be described later, a conductive substrate such as an aluminum foil is used as the negative-electrode current collector. By subtracting the weight of the negative-electrode current collector from the weight of the negative electrode, the weight which is unrelated to the pore diameter distribution can be excluded. In case where the volume of those pores is smaller than 0.05 mL/g, inner parts of the negative electrode are deficient in the nonaqueous electrolyte and, hence, cycle characteristics decrease. In case where the volume of those pores exceeds 0.5 mL/g, the nonaqueous electrolyte is distributed mainly on the negative-electrode side and the positive electrode becomes deficient in the nonaqueous electrolyte. A more preferred range of the volume of those pores is 0.1-0.3 mL/g.

The surface area of pores of 0.01-0.2 μm as determined by the method of mercury penetration is desirably 5-50 m$^2$ per g of the negative electrode (excluding the weight of the negative-electrode current collector). The reasons for this are as follows. The reason why the weight of the negative-electrode current collector is excluded is as described above. In case where the surface area of those pores is smaller than 5 m$^2$/g, it is difficult to form a coating film having reduced resistance on this negative electrode. In addition, such a pore surface area is less effective in promoting electrolyte infiltration, and a coating film of satisfactory quality which inhibits gas evolution is difficult to form.

In case where the surface area of those pores exceeds 50 m$^2$/g, it is difficult to increase electrode density, resulting in a reduced energy density. In addition, this negative electrode has poor electronic conductivity, resulting in reduced output performance. A more preferred range of the surface area of those pores is 7-30 m$^2$/g.

It is preferred that the negative electrode should have pores which are reflected in the following second peak (mesopores) besides the pores reflected in the first peak (macropores). The pores reflected in the second peak are explained below.

<Second Peak>

The pores which are reflected in the second peak mostly are pores possessed by the negative active material itself.

When the negative electrode has a pore diameter distribution, as determined by the method of mercury penetration, which has a second peak having a modal diameter in the range of 0.003-0.02 μm, then electrolyte infiltration is markedly enhanced and excellent high-current characteristics can be realized. This is because the presence of such second-peak pores enables the capillary phenomenon to proceed more effectively. However, in case where the modal diameter of the second peak is smaller than 0.003 μm, an electrolyte material having a high molecular weight has reduced diffusibility and, hence, there is a possibility that infiltration might be lessened rather than enhanced. Consequently, the lower limit of the modal diameter thereof is preferably 0.003 μm. A more preferred range thereof is 0.005-0.015 μm.

The volume of pores of 0.003-0.02 μm as determined by the method of mercury penetration may be 0.0001-0.02 mL per g of the negative electrode (excluding the weight of the negative-electrode current collector). The reason why the weight of the negative-electrode current collector is excluded is as described above. In case where the volume of those pores is smaller than 0.0001 mL/g, the effect of improving the infiltration of the nonaqueous electrolyte is not obtained. In case where the volume of those pores exceeds 0.02 mL/g, the negative active material itself has reduced strength and particle breakage is apt to occur during electrode rolling. As a result, cycle performance and high-rate load characteristics decrease. A more preferred range of the volume of those pores is 0.0005-0.01 mL/g.

In the negative electrode, the surface area of pores of 0.003-0.02 μm as determined by the method of mercury penetration is desirably 0.1-10 $m^2$ per g of the negative electrode (excluding the weight of the negative-electrode current collector). The reasons for this are as follows. The reason why the weight of the negative-electrode current collector is excluded is as described above. In case where the surface area of those pores is smaller than 0.1 $m^2/g$, it is difficult to form a coating film having reduced resistance on this negative electrode. In addition, the effect of improving electrolyte infiltration is difficult to obtain and the effect of inhibiting self-discharge is lessened.

In case where the surface area of those pores exceeds 10 $m^2/g$, it is difficult to increase electrode density, resulting in a reduced energy density. A more preferred range of the surface area of those pores is 0.2-2 $m^2/g$.

It is desirable that the negative electrode should have a pore volume, as determined by the method of mercury penetration, of 0.1-1 mL per g of the negative electrode (excluding the weight of the negative-electrode current collector). The reason why the weight of the negative-electrode current collector is excluded is as described above. When the negative electrode has a pore volume of 0.1 mL/g or larger, this negative electrode can retain the nonaqueous electrolyte in a sufficient amount. In case where the pore volume thereof is smaller than 0.1 mL/g, there is a possibility that this negative electrode might be deficient in the nonaqueous electrolyte to reduce cycle characteristics. On the other hand, the reason why the pore volume of the negative electrode is desirably 1 mL/g or smaller is that too large pore volumes result in a possibility that the nonaqueous electrolyte might be distributed mainly on the negative-electrode side and the positive electrode might become deficient in the electrolyte material. Consequently, the upper limit of the pore volume preferably is 1.0 mL/g. A more preferred range thereof is 0.2-0.5 mL/g.

It is desirable that the negative electrode should have a pore surface area, as determined by the method of mercury penetration, of 5-50 $m^2$ per g of the negative electrode (excluding the weight of the negative-electrode current collector). The reasons for this are as follows. The reason why the weight of the negative-electrode current collector is excluded is as described above. In case where the pore surface area thereof is smaller than 5 $m^2/g$, this negative electrode has a reduced affinity for the nonaqueous electrolyte and, hence, there is a possibility that the infiltration-improving effect of the pore diameter distribution described above cannot be sufficiently obtained. On the other hand, in case where the pore surface area thereof exceeds 50 $m^2/g$, the nonaqueous electrolyte is distributed mainly on the negative-electrode side and the positive electrode becomes deficient in the nonaqueous electrolyte. No improvement in charge/discharge cycle characteristics can hence be attained. A more preferred range of the pore surface area thereof is 7-30 $m^2/g$.

The porosity of the negative electrode (excluding the current collector) is desirably regulated to a value in the range of 20-50%. Thus, the negative electrode can have an excellent affinity for the nonaqueous electrolyte and a high density. A more preferred range of the porosity of the negative electrode is 25-40%.

The density of the negative electrode is desirably regulated to 2 g/mL or higher. This is because negative-electrode densities lower than 2 g/mL may result in a possibility that it might be impossible to obtain a negative electrode having the pore diameter distribution described above. A more preferred range of the density of the negative electrode is 2-2.5 g/mL.

The negative-electrode current collector preferably is an aluminum foil or an aluminum alloy foil. It is preferred that the negative-electrode current collector should have an average crystal grain diameter of 50 μm or smaller. This current collector can have greatly enhanced strength and, hence, the negative electrode can be highly densified by pressing at a high pressure. An increase in battery capacity can hence be attained. Furthermore, this current collector can be prevented from suffering dissolution/corrosion deterioration in overdischarge cycling in a high-temperature atmosphere (40° C. or higher) and can hence inhibit negative-electrode impedance from increasing. In addition, output characteristics, suitability for rapid charge, and charge/discharge cycle characteristics can also be improved. A more preferred range of the average crystal grain diameter of the negative-electrode current collector is up to 30 μm, and an even more preferred range thereof is up to 5 μm.

The average crystal grain diameter is determined in the following manner. The structure in a surface of the current collector is examined with an optical microscope, and the number n of crystal grains present in an area of 1 mm×1 mm is determined. This value of n is used to determine the average crystal grain area S using the equation $S=1\times10^6/n$ ($\mu m^2$) From the value of S obtained, the average crystal grain diameter d (μm) is calculated using the following equation (A).

$$d=2(S/\pi)^{1/2} \quad (A)$$

The aluminum foil or aluminum alloy foil having an average crystal grain diameter in the range up to 50 μm is complicatedly influenced by many factors including material composition, impurities, processing conditions, heat treatment history, and heating conditions in annealing. The crystal grain diameter is regulated in production steps by combining those factors.

The thickness of the aluminum foil or aluminum alloy foil may be 20 μm or smaller, and is more preferably 15 μm or smaller. The aluminum foil preferably has a purity of 99% or higher. The aluminum alloy preferably is an alloy containing an element such as magnesium, zinc, or silicon. On the other hand, the content of transition metals such as iron, copper, nickel, and chromium is preferably regulated to 1% or lower.

A conductive material can be incorporated into a layer containing the negative active material. As the conductive material, use can be made of, for example, a carbon material, a metal powder such as an aluminum powder, or a conductive ceramic such as TiO. Examples of the carbon material include acetylene black, carbon black, coke, carbon fibers, and graphite. More preferred are a powder of coke, graphite, or TiO which has undergone a heat treatment at a temperature of 800-2,000° C. and has an average particle diameter of 10 μm or smaller and carbon fibers having an average diameter of 1 μm or smaller. The carbon material preferably has a BET specific surface area as determined through $N_2$ adsorption of 10 $m^2/g$ or larger.

A binder can be incorporated into the layer containing the negative active material. Examples of the binder include polytetrafluoroethylene (PTFE), poly(vinylidene fluoride) (PVdF), fluororubbers, styrene/butadiene rubbers, and core/shell binders.

With respect to the ratio in which the negative active material, negative-electrode conductive material, and binder are mixed together, the proportion of the negative active material is preferably in the range of from 70% by weight to 96% by weight and that of the negative-electrode conductive material is preferably in the range of from 2% by weight to 28% by weight. Furthermore, the proportion of the binder is preferably in the range of from 2% by weight to 28% by weight. In case where the proportion of the negative-electrode conductive material is smaller than 2% by weight, the layer containing the negative active material has a reduced current-collecting ability, resulting in a possibility that the nonaqueous-electrolyte secondary battery might have reduced high-current characteristics. In case where the proportion of the binder is smaller than 2% by weight, the layer containing the negative active material shows reduced adhesion to the negative-electrode current collector, resulting in a possibility that cycle characteristics might decrease. On the other hand, from the standpoint of increasing capacity, the proportions of the negative-electrode conductive material and the binder are preferably up to 28% by weight each.

The negative electrode is produced, for example, by suspending the negative active material, negative-electrode conductive material, and binder in a solvent in common use to prepare a slurry, applying the slurry to a negative-electrode current collector, drying the coating to form a layer containing the negative active material, and then pressing the resultant structure. The slurry preparation in this procedure may be conducted in the following manner. First, the negative active material, negative-electrode conductive material, and binder are added to a small amount of a solvent. The resultant mixture in the state of having a high solid proportion (the proportion of the negative active material, negative-electrode conductive material, and binder to the solvent is high) is kneaded with a planetary mixer or the like to apply a high shear force thereto and thereby evenly disperse the solid ingredients. In this operation, in case where the solid proportion is not sufficiently high, the shear force which can be applied is low and the negative active material which has aggregated cannot be sufficiently pulverized. The solid ingredients are not evenly dispersed in this case. The importance of this step becomes higher as the particle diameter of the negative active material becomes smaller. When particles having an average particle diameter of 1 μm or smaller are handled, that step is especially important. After the mixture in the state of having a high solid proportion has been sufficiently kneaded, a solvent is added thereto to gradually lower the solid proportion and regulate the resultant slurry so as to have a viscosity preferable for application. This slurry having a viscosity preferable for application is further sufficiently mixed by means of a bead mill using ceramic balls as a medium. Through this step, edges of the active-material particles are rounded, and the active-material particles come to have a smooth surface. The active-material particles thus treated can be packed at a high density and bring about a pore diameter distribution shifted to the smaller-diameter side. Thus, a negative electrode having the pore diameter distribution described in regard to this embodiment is obtained. The ceramic balls to be used can be made of any of various materials including glass, alumina, mullite, and silicon nitride. However, balls made of zirconia are preferred from the standpoints of wearing resistance and impact resistance. The diameter of the balls is preferably 0.5-5 mm. In case where the diameter of the balls is smaller than 0.5 mm, such balls give too low an impact force. In case where the diameter of the balls exceeds 5 mm, the area in which the medium balls come into contact with one another is reduced, resulting in a reduced kneading ability. A more preferred range of the diameter of the balls is 1-3 mm.

The slurry obtained is applied to a negative-electrode current collector and dried. Thereafter, the coated current collector is rolled with a roller press or the like to complete a negative electrode. In this operation, the roll temperature is preferably regulated to 40-180° C. In case where the roll temperature is too low, the conductive material, which has a smaller specific gravity than the negative active material, comes to localize in the electrode surface upon pressing and a high-density electrode having moderate pores is not obtained. In addition, the resultant electrode has reduced suitability for impregnation with an electrolyte. Battery performances also decrease. In case where the roll temperature is higher than 180° C., crystallization of the binder proceeds to reduce electrode flexibility. The resultant layer containing the negative active material is apt to break or peel off. As a result, productivity decreases and battery performances such as output characteristics and charge/discharge cycle characteristics decrease. A more preferred range of the roll temperature is 90-150° C.

Incidentally, the negative electrode may contain either or both of the compound having pyridine groups and the compound having one or more silyl groups which are to be added to the nonaqueous electrolyte.

2) Nonaqueous Electrolyte

The nonaqueous electrolyte is a liquid nonaqueous electrolyte prepared by dissolving at least one electrolyte material in an organic solvent. The nonaqueous-electrolyte battery of the embodiments of the invention is characterized in that the nonaqueous electrolyte further contains a compound having pyridine groups and a compound having one or more silyl groups.

For the reasons given hereinabove, a stable coating film is formed on the surface of the negative electrode by using those compounds in combination, whereby satisfactory life characteristics and the diminution of self-discharge can be reconciled.

The compound having pyridine groups is any of compounds each containing at least either of general formula (1) and general formula (2) as a repeating unit.

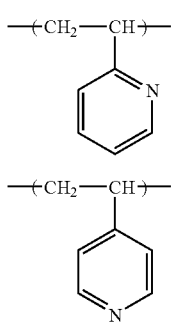

(1)

(2)

These compounds have a high oxidation potential and are hence less apt to be decomposed on the positive-electrode side. Furthermore, these compounds have a reduction potential of 0.9 V vs. $Li/Li^+$, which is slightly lower than the insertion/release potential of the lithium-titanium composite oxide. Because of this, a coating film effective in inhibiting self-discharge can be formed on the surface of the negative electrode.

Specifically, it is desirable that the compound having pyridine groups should be at least any of poly(2-vinylpyridine), poly(4-vinylpyridine), copolymers of 2-vinylpyridine and 4-vinylpyridine, copolymers of 2-vinylpyridine and one or more other monomers, and copolymers of 4-vinylpyridine and one or more other monomers. These compounds each desirably have an average molecular weight (Mw) in the range of from 3,000 to 160,000. More desirable is poly(2-vinylpyridine) or poly(4-vinylpyridine).

The compound having one or more silyl groups is a compound having one or more functional groups each represented by general formula (3).

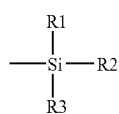

(3)

(In formula (3), R1 to R3 each independently represent an alkyl group having 1-10 carbon atoms, an alkenyl group having 2-10 carbon atoms, or an aryl group having 6-10 carbon atoms.)

Examples of the compound having one or more functional groups each represented by general formula (3) include ones having three, two, or one functional group represented by general formula (3).

Examples of the compound having three groups of that kind include tris(trimethylsilyl)phosphate, tris(triethylsilyl)phosphate, and tris(vinyldimethylsiyl)phosphate. More preferred is tris(trimethylsilyl)phosphate.

Examples of the compound having two groups of that kind include bis(trimethylsilyl)methyl phosphate, bis(trimethylsilyl)ethyl phosphate, bis(trimethylsilyl) n-propyl phosphate, bis(trimethylsilyl)isopropyl phosphate, bis(trimethylsilyl) n-butyl phosphate, bis(trimethylsilyl)trichloroethyl phosphate, bis(trimethylsilyl)trifluoroethyl phosphate, bis(trimethylsilyl)pentafluoropropyl phosphate, and bis(trimethylsilyl)phenyl phosphate.

Furthermore, examples of the compound having one group of that kind include dimethyl trimethylsilyl phosphate, diethyl trimethylsilyl phosphate, di-n-propyl trimethylsilyl phosphate, diisopropyl trimethylsilyl phosphate, di-n-butyl trimethylsilyl phosphate, bis(trichloroethyl)trimethylsilyl phosphate, bis(trifluoroethyl)trimethylsilyl phosphate, bis(pentafluoropropyl)trimethylsilyl phosphate, and diphenyl trimethylsilyl phosphate.

Such compounds having one or more functional groups represented by general formula (3) may be used alone or in combination of two or more thereof.

Preferred of such compounds having one or more functional groups represented by general formula (3) are phosphoric acid compounds, with phosphoric acid silyl esters being more preferred. This is because such a silyl phosphate, upon reductional decomposition, yields lithium phosphate and this lithium phosphate stabilizes on the surface of the negative electrode and contributes to the formation of a coating film of satisfactory quality. Specific examples of the preferred compounds include tris(trimethylsilyl)phosphate. A chemical formula of tris(trimethylsilyl)phosphate (TMSP) is shown below.

Tris(trimethylsilyl)phosphate (TMSP)

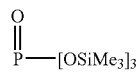

Other preferred examples of the compound having one or more functional groups represented by general formula (3) include fluorotrimethylsilane. It is preferred to use a mixture of any of the phosphoric acid silyl esters and fluorotrimethylsilane when a positive electrode containing manganese is employed, for example, when a positive electrode containing a lithium manganate having a spinel structure is employed. Examples of preferred combinations include a combination of tris(trimethylsilyl)phosphate and fluorotrimethylsilane. In the case where a mixture of any of the phosphoric acid compounds and fluorotrimethylsilane is used, it is preferred to use a nonaqueous solvent containing γ-butyrolactone (GBL). Examples of the lithium manganese having a spinel structure include $Li_xMn_{2-y}M_yO_4$ ($0 \leq x \leq 1.2$, $0 \leq y < 1$, and M is an element other than Mn).

There are cases where the phosphoric acid compounds shown above react with an acid generated in the battery, such as hydrofluoric acid, to become fluorotrimethylsilane. This fluorotrimethylsilane thus obtained by conversion also contributes to the effects of the embodiment of the invention.

The compound having pyridine groups undergoes moderate reductional decomposition on the surface of the negative electrode, whereby a stable coating film which inhibits self-discharge can be formed. This coating film can inhibit self-discharge because it can inhibit the nonaqueous electrolyte from being excessively decomposed on the surface of the negative electrode. However, the coating film itself formed by the addition of the compound having pyridine groups has high resistance.

On the other hand, the compound having one or more silyl groups is thought to slightly decompose at a potential higher than the decomposition potential of the compound having pyridine groups and have the effect of inhibiting the compound having pyridine groups from being excessively decomposed. Namely, the reaction of the silyl compound in which it undergoes reductional decomposition on the surface of the negative electrode to form a coating film occurs preferentially to the reaction of the compound having pyridine groups. This coating film has low charge transfer resistance and, hence, enables lithium ions to be smoothly inserted in inner parts of the negative electrode and smoothly released therefrom. Consequently, battery resistance can be reduced.

The content of the compound having pyridine groups is preferably from 0.01% by weight to 3% by weight, more preferably in the range of from 0.03% by weight to 1% by weight, based on the whole nonaqueous electrolyte. When the content thereof is 0.01% by weight or higher, self-discharge can be effectively inhibited. When the content thereof is 3% by weight or lower, a coating film having reduced resistance can be formed. On the other hand, the content of the compound having one or more silyl groups is preferably from 0.1% by weight to 20% by weight, more preferably in the range of from 0.1% by weight to 10% by weight, even more desirably from 0.5% by weight to 5% by weight. When the content thereof is from 0.1% by weight to 20% by weight, resistance can be inhibited from increasing and self-discharge can be effectively inhibited.

Whether or not a nonaqueous electrolyte contains the compound having pyridine groups and the compound having one or more silyl groups can be determined, for example, with a TG-MS (thermogravimetric/mass-spectrometric apparatus) or a pyrolytic MS (mass-spectrometric apparatus) Specifically, the nonaqueous electrolyte as a sample is heated and the gas thus evolved is analyzed, whereby the generation of flammable ingredients can be detected.

For determining the proportion by volume of each ingredient contained in the nonaqueous electrolyte, use can be made of GC, NMR (nuclear magnetic resonance spectroscopy), or the like.

Examples of the electrolyte material include lithium salts such as lithium perchlorate ($LiClO_4$), lithium phosphate hexafluoride ($LiPF_6$), lithium borate tetrafluoride ($LiBF_4$), arsenic lithium hexafluoride ($LiAsF_6$), lithium trifluoromethanesulfonate ($LiCF_3SO_3$), and bistrifluoromethylsulfonylimidolithium [$LiN(CF_3SO_2)_2$]. One electrolyte material or two or more electrolyte materials may be used. It is preferred to use one or more electrolyte materials which are less apt to be oxidized even at high potentials. More preferred is $LiPF_6$.

It is desirable that such electrolyte material(s) should be dissolved in an organic solvent in a concentration of from 0.5 mol/L to 2.5 mol/L.

Examples of the organic solvent include cyclic carbonates such as propylene carbonate (PC), ethylene carbonate (EC), and vinylene carbonate, chain carbonates such as diethyl carbonate (DEC), dimethyl carbonate (DMC), and methyl ethyl carbonate (MEC), cyclic ethers such as tetrahydrofuran (THF), 2-methyltetrahydrofuran (2MeTHF), and dioxolane (DOX), chain ethers such as dimethoxyethane (DME) and diethoxyethane (DEE), γ-butyrolactone (GBL), acetonitrile (AN), and sulfolane (SL). Such compounds may be used alone or as a mixture of two or more thereof.

Preferred examples of the organic solvent include mixed solvents obtained by mixing two or more members selected from the group consisting of diethylene carbonate (DEC), propylene carbonate (PC), and γ-butyrolactone (GBL). More preferred examples of the organic solvent include γ-butyrolactone (GBL). The reasons for this are as follows.

First, γ-butyrolactone, DEC, and PC are high in boiling point and flash point and have excellent thermal stability.

Secondly, γ-butyrolactone is more apt to be reduced than chain carbonates and cyclic carbonates. Upon reduction, γ-butyrolactone in cooperation with the compound having pyridine groups can form a more stable protective coating film. A similar effect is produced with the mixed solvent.

For forming a protective coating film of better quality, it is preferred to regulate the content of γ-butyrolactone so as to be from 40% by volume to 95% by volume based on the organic solvent.

Although the nonaqueous electrolyte containing γ-butyrolactone produces the excellent effect described above, it has a high viscosity and shows reduced infiltration into the electrodes. However, when a negative active material having an average particle diameter of 1 μm or smaller is used, even the nonaqueous electrolyte containing γ-butyrolactone can be smoothly infiltrated into the negative electrode. Thus, not only productivity but also output characteristics and charge/discharge cycle characteristics can be improved.

3) Positive Electrode

The positive electrode includes a positive-electrode current collector and a layer containing a positive active material. The layer includes a positive active material, a positive-electrode conductive material, and a binder and has been deposited on one side or each side of the positive-electrode current collector.

Examples of the positive active material include oxides, sulfides, and polymers.

Examples of the oxides include manganese dioxide ($MnO_2$), iron oxide, copper oxide, and nickel oxide which each have inserted lithium, lithium-manganese composite oxides (e.g., $Li_xMn_2O_4$ or $Li_xMnO_2$), lithium-nickel composite oxides (e.g., $Li_xNiO_2$), lithium-cobalt composite oxides ($Li_xCoO_2$), lithium-nickel-cobalt composite oxides (e.g., $LiNi_{1-y}CO_yO_2$), lithium-manganese-cobalt composite oxides (e.g., $LiMn_yCo_{1-y}O_2$), spinel lithium-manganese-nickel composite oxides ($Li_xMn_{2-y}Ni_yO_4$), lithium-phosphorus oxides having the olivine structure ($Li_xFePO_4$, $Li_xFe_{1-y}Mn_yPO_4$, $Li_xCoPO_4$, etc.), iron sulfate ($Fe_2(SO_4)_3$), vanadium oxides (e.g., $V_2O_5$), and lithium-nickel-cobalt-manganese composite oxides.

Examples of the polymers include conductive polymeric materials such as polyaniline and polypyrrole and disulfide-based polymeric materials. Also usable besides these are sulfur (S), fluorocarbons, and the like.

Examples of positive active materials with which a high positive-electrode voltage is obtained include lithium-manganese composite oxides ($Li_xMn_2O_4$), lithium-nickel composite oxides ($Li_xNiO_2$), lithium-cobalt composite oxides ($Li_xCoO_2$), lithium-nickel-cobalt composite oxides ($Li_xNi_{1-y}CO_yO_2$), spinel lithium-manganese-nickel composite oxides ($Li_xMn_{2-y}Ni_yO_4$), lithium-manganese-cobalt composite oxides ($Li_xMn_yCo_{1-y}O_2$) lithium iron phosphates ($Li_xFePO_4$), and lithium-nickel-cobalt-manganese composite oxides. Incidentally, x and y each preferably is in the range of 0-1.

The lithium-nickel-cobalt-manganese composite oxides preferably have a composition represented by $Li_aNi_bCO_cMn_dO_2$ (provided that the molar proportions a, b, c, and d satisfy $0 \leq a \leq 1.1$, $0.1 \leq b \leq 0.5$, $0 \leq c \leq 0.9$, and $0.1d \leq d \leq 0.5$).

The compositions of the lithium-transition metal composite oxides should not be construed as being limited to those, and may further include unavoidable impurities, etc.

Furthermore, it is preferred that the lithium-transition metal composite oxides each should have, on part of the surface of the particles thereof, an oxide containing at least one element selected from the group consisting of Al, Mg, Zr, B, Ti, and Ga. Examples of the oxide include $Al_2O_3$, MgO, $ZrO_2$, $B_2O_3$, $TiO_2$, and $Ga_2O_3$. The presence of these oxides is effective in inhibiting the oxidative decomposition of the electrolyte on the surface of the positive active material. For example, since not only the solvent in the electrolyte but also additives themselves can oxidatively decompose, use of a positive active material having any of those oxides on the surface of the particles thereof is effective in inhibiting the oxidative decomposition of the additives. Battery life prolongation is hence possible.

The oxide containing at least one element selected from the group consisting of Al, Mg, Zr, B, Ti, and Ga may be contained in any proportion by weight to the lithium-transition metal composite oxide. However, the amount of that oxide to be contained is preferably 0.5-15% by weight, more preferably 1-5% by weight, based on the final lithium-transition metal composite oxide. The reasons for this are as follows. In case where the amount of that oxide is smaller than 0.5% by weight, the lithium-transition metal composite oxide undergoes substantially no change. In contrast, in case where the amount of that oxide exceeds 15% by weight, performances of the lithium ion battery employing such lithium-transition metal composite oxide as a positive active material are adversely influenced. The lithium-transition metal composite oxide may include lithium-transition metal composite oxide particles having that oxide adherent thereto and lithium-transition metal composite oxide particles having no such oxide adherent thereto.

In a more preferred embodiment, MgO, $ZrO_2$, or $B_2O_3$ is used as that oxide. When the lithium-transition metal composite oxide having any of these oxides adherent thereto is utilized as a positive active material, a charge voltage can be increased to a higher value (e.g., 4.4 V or above) and charge/discharge cycle characteristics can be improved.

For adhering that oxide to lithium-transition metal composite oxide particles, for example, a method in which the particles are impregnated with an aqueous solution containing ions of Al, Mg, Zr, B, Ti, or Ga and the resultant impregnated lithium-transition metal composite oxide particles are burned to thereby synthesize the target particles may be used. The state of the aqueous solution to be used for the impregnation is not particularly limited so long as the solution can deposit the oxide of Al, Mg, Zr, B, Ti, or Ga on the surface of the lithium-transition metal composite oxide through burning. An aqueous solution containing Al, Mg, Zr, B, Ti, or Ga in an appropriate form can be used. Examples of the forms of these metals (including boron) include the oxynitrates, nitrates, acetates, sulfates, carbonates, hydroxides, or acids of Al, Mg, Zr, B, Ti, and Ga($=$M).

As stated above, MgO, $ZrO_2$, or $B_2O_3$ is used as that oxide in a more preferred embodiment. Because of this, it is more preferred that the M ions should be Mg ions, Zr ions, or B ions and that the aqueous solution containing M ions to be used should be an aqueous $Mg(NO_3)_2$ solution, aqueous $ZrO(NO_3)_2$ solution, aqueous $ZrCO_4.ZrO_2.8H_2O$ solution, aqueous $Zr(SO_4)_2$ solution, aqueous $H_3BO_3$ solution, or the like. It is more preferred to use an aqueous $Mg(NO_3)_2$ solution, aqueous $ZrO(NO_3)_2$ solution, or aqueous $H_3BO_3$ solution among those. The concentration of the aqueous solution of M ions is not particularly limited. However, a saturated solution is preferred because a reduced solution volume suffices for the impregnation step. In the embodiments of the invention, examples of the form of M ions in the aqueous solution thereof include not only ions of element M alone but also ions made up of element M and other element(s) bonded thereto. In the case of boron, for example, examples of the ions include $B(OH)_4^-$.

In impregnating the lithium-transition metal composite oxide with the aqueous solution of M ions, the ratio by weight between the lithium-transition metal composite oxide and the aqueous solution of M ions is not particularly limited, and may be suitably determined according to the composition of the lithium-transition metal composite oxide to be produced. The period of impregnation is not particularly limited so long as the composite oxide particles are sufficiently impregnated. Impregnation temperature also is not particularly limited.

The lithium-transition metal composite oxide is obtained by burning the impregnated particles. In this step, a burning temperature and a burning period can be determined so as to be within respective ranges preferable for the burning. However, the burning is conducted preferably at 400-800° C. for 1-5 hours, more preferably at 600° C. for 3 hours. The burning may be conducted in an oxygen stream or in the air. Although the impregnated particles may be burned as they are, it is preferred to dry the particles before the burning in order to remove the water from the mixture. This drying can be conducted by a common technique. For example, heating in an oven, hot-air drying, and the like can be used alone or in combination of two or more thereof. It is preferred that this drying be conducted in an atmosphere of oxygen, air, or the like.

The lithium-transition metal composite oxide thus obtained may be pulverized according to need.

The positive active material has a primary-particle diameter of preferably from 100 nm to 1 μm. When the active material has a primary-particle diameter of 100 nm or larger, this material is easy to handle in industrial production. When the primary-particle diameter thereof is 1 μm or smaller, the diffusion of lithium ions within the solid can proceed smoothly.

The positive active material has a specific surface area of preferably from $0.1\,m^2/g$ to $10\,m^2/g$. When the active material has a specific surface area of $0.1\,m^2/g$ or larger, insertion/release sites for lithium ions are sufficiently secured. When the specific surface area thereof is $10\,m^2/g$ or smaller, this active material is easy to handle in industrial production and satisfactory charge/discharge cycle performance can be secured.

Examples of the positive-electrode conductive material, which functions to enhance current-collecting ability and reduce the resistance of contact with the current collector, include carbonaceous substances such as acetylene black, carbon black, and graphite.

Examples of the binder for binding the positive active material to the positive-electrode conductive material include polytetrafluoroethylene (PTFE), poly(vinylidene fluoride) (PVdF), and fluororubbers.

With respect to the ratio in which the positive active material, positive-electrode conductive material, and binder are mixed together, the proportion of the positive active material is preferably in the range of from 80% by weight to 95% by weight and that of the positive-electrode conductive material is preferably in the range of from 3% by weight to 18% by weight. Furthermore, the proportion of the binder is preferably in the range of from 2% by weight to 17% by weight. With respect to the positive-electrode conductive material, proportions thereof not smaller than 3% by weight enable the conductive material to produce the effects described above, while proportions thereof not larger than 18% by weight are effective in diminishing the decomposition of the nonaqueous electrolyte on the surface of the positive-electrode conductive material during high-temperature storage. With respect to the binder, proportions thereof not smaller than 2% by weight give sufficient electrode strength, while proportions thereof not larger than 17% by weight are effective in reducing the internal resistance of the electrode because of the reduced insulator amount in the electrode.

The positive electrode is produced, for example, by suspending the positive active material, positive-electrode conductive material, and binder in an appropriate solvent to prepare a slurry, applying the slurry to a positive-electrode current collector, drying the coating to form a layer containing the positive active material, and then pressing the resultant structure. Alternatively, the positive active material, positive-electrode conductive material, and binder may be formed into a pellet for use as a layer containing the positive active material.

The positive-electrode current collector preferably is an aluminum foil or an aluminum alloy foil, and has an average crystal grain diameter of preferably 50 µm or smaller like the negative-electrode current collector. The average crystal grain diameter thereof is more preferably 30 µm or smaller, even more preferably 5 µm or smaller. When the aluminum foil or aluminum alloy foil has an average crystal grain diameter of 50 µm or smaller, this foil can have greatly enhanced strength and the positive electrode can be highly densified at a high pressing pressure. Thus, an increase in battery capacity can be attained.

The aluminum foil or aluminum alloy foil having an average crystal grain diameter in the range up to 50 µm is complicatedly influenced by factors including material composition, impurities, processing conditions, heat treatment history, and annealing conditions. The crystal grain diameter is regulated in production steps by combining those factors.

The thickness of the aluminum foil or aluminum alloy foil may be 20 µm or smaller, and is more preferably 15 µm or smaller. The aluminum foil preferably has a purity of 99% or higher. The aluminum alloy preferably is an alloy containing an element such as magnesium, zinc, or silicon. On the other hand, the content of transition metals such as iron, copper, nickel, and chromium is preferably regulated to 1% or lower.

4) Separators

Examples of the separators include porous films including polyethylene, polypropylene, cellulose, or poly(vinylidene fluoride) (PVDF) and nonwoven fabrics made of synthetic resins. Of these, a porous film made of polyethylene or polypropylene is preferred from the standpoint of safety improvements because this porous film can melt at a certain temperature to shut off current.

The separators preferably have a median pore diameter as determined by the method of mercury penetration of from 0.15 µm to 1.0 µm. In case where the median pore diameter thereof is smaller than 0.15 µm, such separators have increased film resistance, resulting in a decrease in output. In case where the median pore diameter thereof is larger than 1.0 µm, shutdown by such separators does not occur evenly, resulting in impaired safety. In addition, the capillary diffusion of the electrolyte is less apt to occur in such separators, and the resultant deficiency in the electrolyte leads to cycle characteristics deterioration. A more preferred range of the median pore diameter thereof is from 0.18 µm to 0.40 µm.

The separators preferably have a modal pore diameter as determined by the method of mercury penetration of from 0.12 µm to 0.5 µm. In case where the modal pore diameter thereof is smaller than 0.12 µm, such separators have increased film resistance, resulting in a decrease in output. In addition, such separators alter in a high-temperature and high-voltage environment to suffer pore collapse, resulting in a decrease in output. In case where the modal pore diameter thereof is larger than 0.5 µm, shutdown by such separators does not occur evenly, resulting in impaired safety. A more preferred range of the modal pore diameter thereof is from 0.18 µm to 0.35 µm.

The separators have a porosity of preferably from 45% to 75%. In case where the porosity thereof is lower than 45%, the absolute amount of ions which can be present in such separators is smaller, resulting in a decrease in output. In case where the porosity thereof exceeds 75%, not only such separators have reduced strength but also shutdown by the separators does not occur evenly, resulting in impaired safety. A more preferred range of the porosity thereof is from 50% to 60%.

5) Case Member

Examples of the case member include laminated films having a thickness of 0.2 mm or smaller and metallic containers having a wall thickness of 0.5 mm or smaller. The wall thickness of the metallic containers is more preferably 0.2 mm or smaller.

Examples of the shape include flat, prismatic, cylindrical, coin, button, sheet, and multilayer shapes. It is a matter of course that the battery of the embodiments of the invention may be a small battery for mounting in portable electronic appliances or a large battery for mounting on two- to four-wheeled vehicles, etc.

The laminated films may be multilayered films including a metal layer and a resin layer with which the metal layer is coated. From the standpoint of weight reduction, the metal layer preferably is an aluminum foil or aluminum alloy foil. The resin layer is for reinforcing the metal layer. For forming the resin layer, use can be made of a polymer such as polypropylene (PP), polyethylene (PE), nylon, or poly(ethylene terephthalate) (PET). The laminated films are formed by sealing by thermal fusion.

Examples of the material of the metallic containers include aluminum and aluminum alloys. The aluminum alloys preferably are alloys containing an element such as magnesium, zinc, or silicon. On the other hand, the content of transition metals such as iron, copper, nickel, and chromium is preferably regulated to 1% or lower. Use of such a metallic container can greatly improve long-term reliability and heat-dissipating properties in a high-temperature environment.

The metallic can made of aluminum or an aluminum alloy has an average crystal grain diameter of preferably 50 µm or smaller, more preferably 30 µm or smaller, even more preferably 5 µm or smaller. When the average crystal grain diameter thereof is 50 µm or smaller, the metallic can made of aluminum or an aluminum alloy can have greatly enhanced strength and a further reduced wall thickness. As a result, a battery which is lightweight, has a high output and excellent long-term reliability, and is preferable, for example, for mounting in vehicles can be realized.

6) Negative-Electrode Terminal

The negative-electrode terminal can be formed from a material which has electrical stability in the potential range of from 0.4 V to 3 V based on lithium ion/metal and further has electrical conductivity. Examples of the material include aluminum alloys containing an element such as Mg, Ti, Zn, Mn, Fe, Cu, or Si, and further include aluminum. From the standpoint of reducing contact resistance, it is preferred to use the same material as the negative-electrode current collector.

7) Positive-Electrode Terminal

The positive-electrode terminal can be formed from a material which has electrical stability in the potential range of from 3 V to 5 V based on lithium ion/metal and further has electrical conductivity. Examples of the material include aluminum alloys containing an element such as Mg, Ti, Zn, Mn, Fe, Cu, or Si, and further include aluminum. From the standpoint of reducing contact resistance, it is preferred to use the same material as the positive-electrode current collector.

(Second Embodiment)

Figure 3:
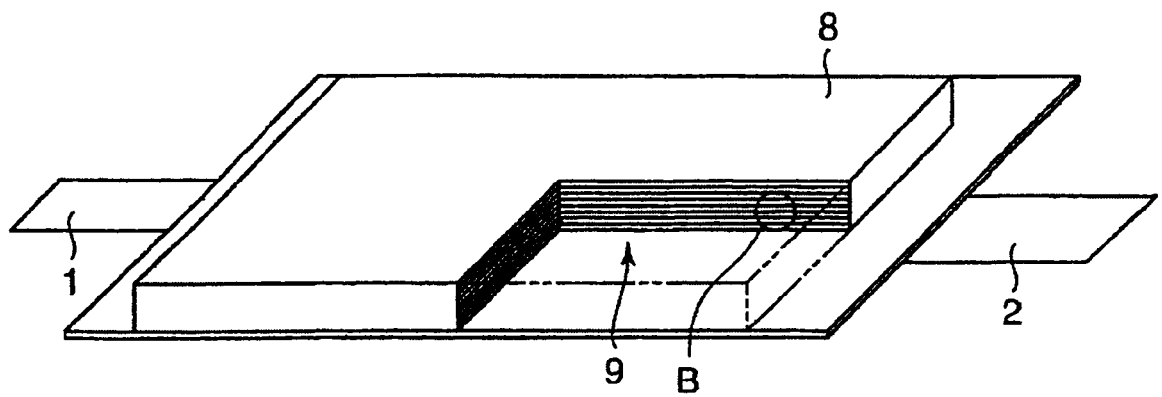
FIG. 3 is a diagrammatic sectional view of a nonaqueous-electrolyte secondary battery according to another embodiment of the invention.
Figure 4:
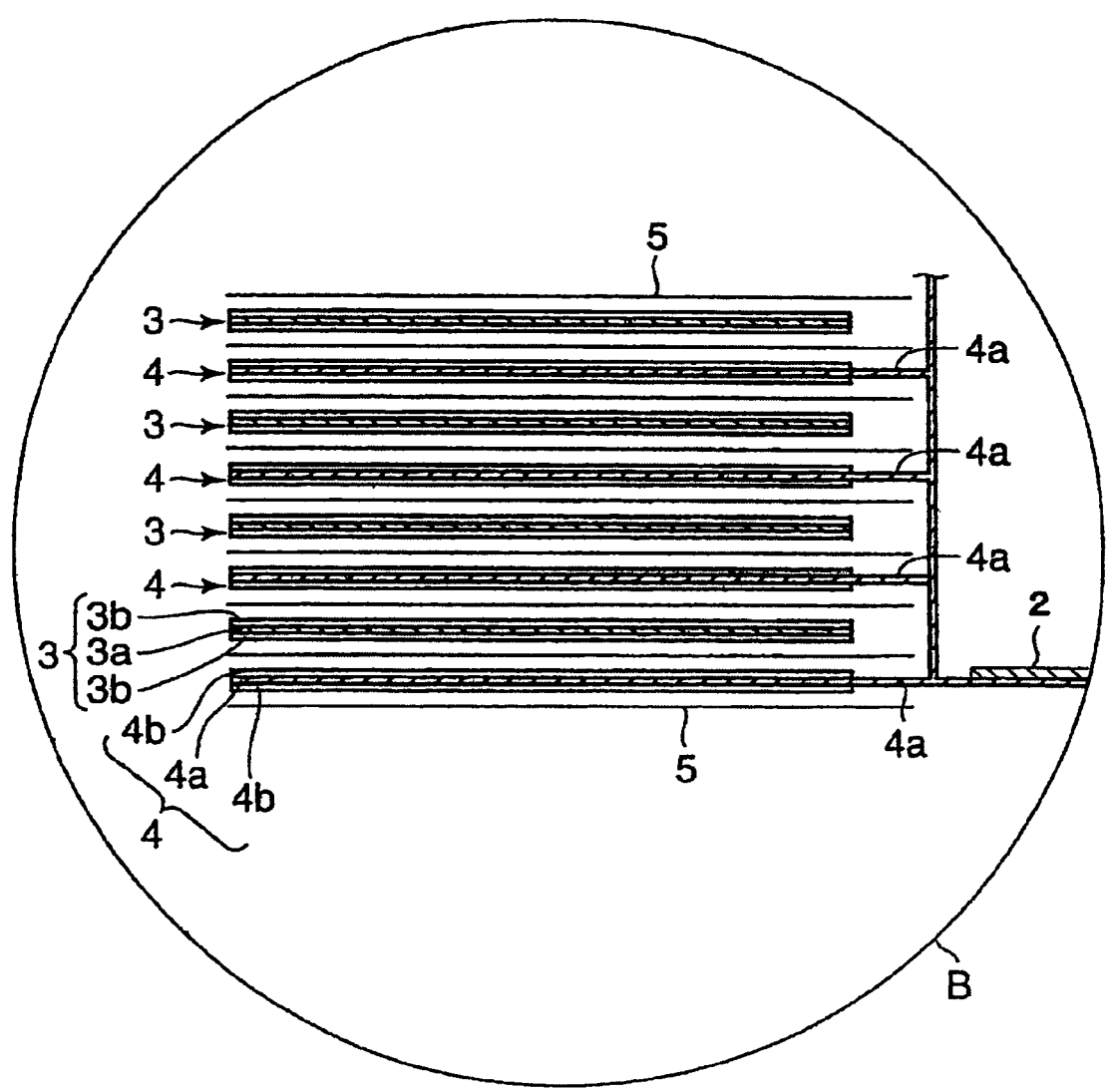
FIG. 4 is a diagrammatic sectional view showing in detail that part in FIG. 3 which is surrounded by the circle B.

The constitution of the nonaqueous-electrolyte battery should not be construed as being limited to that shown in FIG. 1 and FIG. 2 described above. For example, the nonaqueous-electrolyte battery can be produced so as to have the constitution shown in FIG. 3 and FIG. 4. FIG. 3 is a partially cutaway slant view diagrammatically illustrating another flat type nonaqueous-electrolyte secondary battery according to a second embodiment. FIG. 4 is an enlarged sectional view of the part B in FIG. 3.

As shown in FIG. 3, a multilayer type electrode group 9 is held in a case member 8 made of a laminated film. The multilayer type electrode group 9 has a structure formed by alternately stacking a positive electrode 3 and a negative electrode 4 together with a separator 5 interposed between these, as shown in FIG. 4. There are more than one positive electrode 3, and each positive electrode 3 includes a positive-electrode current collector 3a and layers 3b containing a positive active material and deposited respectively on both sides of the positive-electrode current collector 3a. There are more than one negative electrode 4, and each negative electrode 4 includes a negative-electrode current collector 4a and layers 4b containing a negative active material and deposited respectively on both sides of the negative-electrode current collector 4a. One edge of the negative-electrode current collector 4a of each negative electrode 4 protrudes from the positive electrodes 3. Those parts of the negative-electrode current collectors 4a which are protrudent from the positive electrodes 3 have been electrically connected to a strip-form negative-electrode terminal 2. An end of the strip-form negative-electrode terminal 2 has been drawn out from the case member 8. Furthermore, that edge of the positive-electrode current collector 3a of each positive electrode 3 which is located on the side opposite to the protrudent edges of the negative-electrode current collectors 4a protrudes from the negative electrodes 4, although this is not shown in the figure. Those parts of the positive-electrode current collectors 3a which are protrudent from the negative electrodes 4 have been electrically connected to a strip-form positive-electrode terminal 1. An end of the strip-form positive-electrode terminal 1 is located on the side opposite to the negative-electrode terminal 2 and has been drawn out from an edge of the case member 8.

One example of the battery cell according to a first embodiment was explained above by reference to FIG. 1 and FIG. 2, in which the electrode group including a positive electrode and a negative electrode was a group of wound electrodes. However, the structure of the electrode group may be changed to a multilayer structure.

(Battery Pack)

A battery pack obtained by connecting battery cells in an electrically serial or parallel arrangement to fabricate a battery assembly and combining this battery assembly with a battery control circuit, etc. is explained below as an example by reference to FIG. 5 and FIG. 6.

This battery pack as an embodiment includes nonaqueous-electrolyte batteries (cells) each having the constitution described above, and the cells have been connected in an electrically serial or parallel arrangement.

This battery pack is explained in detail by reference to FIG. 5 and FIG. 6. As the cells can be used, for example, flat type batteries each having the constitution shown in FIG. 1 and FIG. 2.

The cells 21 containing such flat type nonaqueous-electrolyte batteries have been stacked so that the negative-electrode terminals 6 and the positive-electrode terminals 7 project outward in the same direction, and bound with a pressure-sensitive adhesive tape 22 to thereby constitute a battery assembly 23. These cells 21 have been electrically serially connected as shown in FIG. 6.

A printed wiring board 24 has been disposed so as to face that side of the cells 21 on which the negative-electrode terminals 6 and positive-electrode terminals 7 project. As shown in FIG. 6, a thermistor 25, a protective circuit 26, and a terminal 27 for electrical connection to external apparatus have been mounted on the printed wiring board 24. That side of the printed wiring board 24 which faces the battery assembly 23 has an insulating sheet (not shown) for avoiding unnecessary connection to the wiring of the battery assembly 23.

A positive-electrode lead 28 has been connected to the positive-electrode terminal 7 located at the lowermost layer of the battery assembly 23, and the end thereof has been inserted in and electrically connected to a positive-electrode connector 29 of the printed wiring board 24. A negative-electrode lead 30 has been connected to the negative-electrode terminal 6 located at the uppermost layer of the battery assembly 23, and the end thereof has been inserted in and electrically connected to a negative-electrode connector 31 of the printed wiring board 24. These connectors 29 and 31 have been connected to the protective circuit 26 via wirings 32 and 33 formed on the printed wiring board 24.

The thermistor 25 measures the temperature of the cells 21, and the measurement signals are sent to the protective circuit 26. The protective circuit 26 can break, under given conditions, a plus-side wiring 34a and a minus-side wiring 34b both disposed between the protective circuit 26 and the terminal 27 for connection to external apparatus. The given conditions include, for example, ones in which the temperature measured by the thermistor 25 has reached a given temperature or higher. The given conditions further include ones in which the overcharge, overdischarge, overcurrent, or the like of the cells 21 has been detected. This detection of overcharge, etc. is made for each cell 21 or for the cells 21 as a whole. In the case where overcharge, etc. is detected with respect to each cell 21, the cell voltage may be measured or the positive-electrode potential or negative-electrode potential may be measured. In the latter case, a lithium electrode for use as a reference electrode is inserted into each cell 21. In the case illustrated in FIG. 5 and FIG. 6, a wiring 35 for voltage measurement is connected to each of the cells 21, and measurement signals are sent to the protective circuit 26 through these wirings 35.

Those three sides of the battery assembly 23 which exclude the side where the positive-electrode terminals 7 and the negative-electrode terminals 6 protrude each have a protective sheet 36 disposed thereon which is made of a rubber or resin.

The battery assembly 23 is packed into a container 37 together with the protective sheets 36 and the printed wiring board 24. Namely, the protective sheets 36 are disposed respectively on the two length-direction inner faces and one width-direction inner face of the container 37, and the printed wiring board 24 is disposed on the width-direction inner face on the opposite side. The battery assembly 23 is positioned in the space surrounded by the protective sheets 36 and the printed wiring board 24. A lid 38 has been attached to the top of the container 37.

Incidentally, a heat-shrinkable tube may be used in place of the pressure-sensitive adhesive tape 22 for fixing the battery assembly 23. In this case, cells stacked are bound by disposing protective sheets respectively on both sides of the stacked cells, lapping the heat-shrinkable tube therearound, and thermally shrinking the heat-shrinkable tube.

Figure 5:
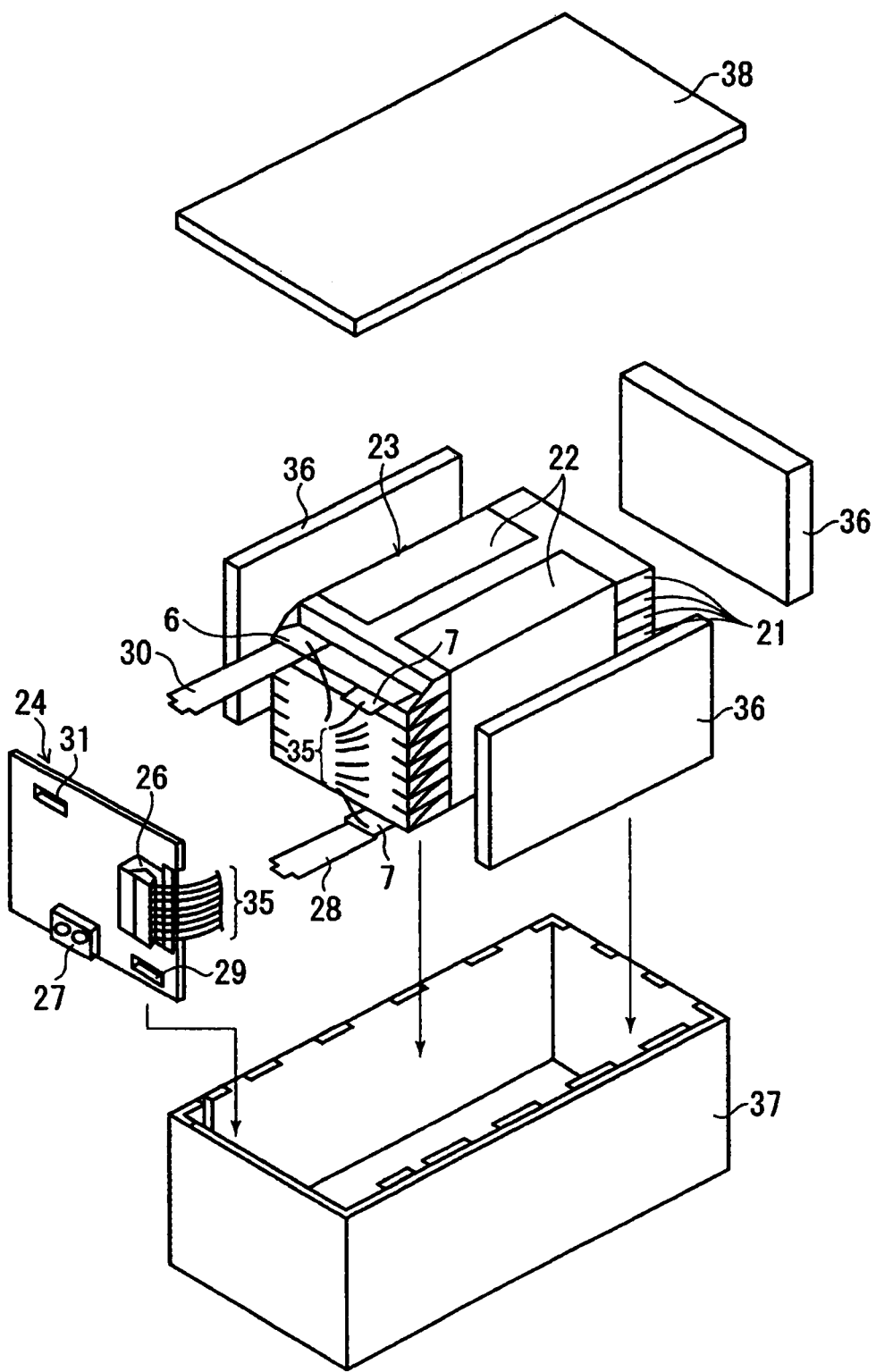
FIG. 5 is an exploded slant view of a battery pack.
Figure 6:
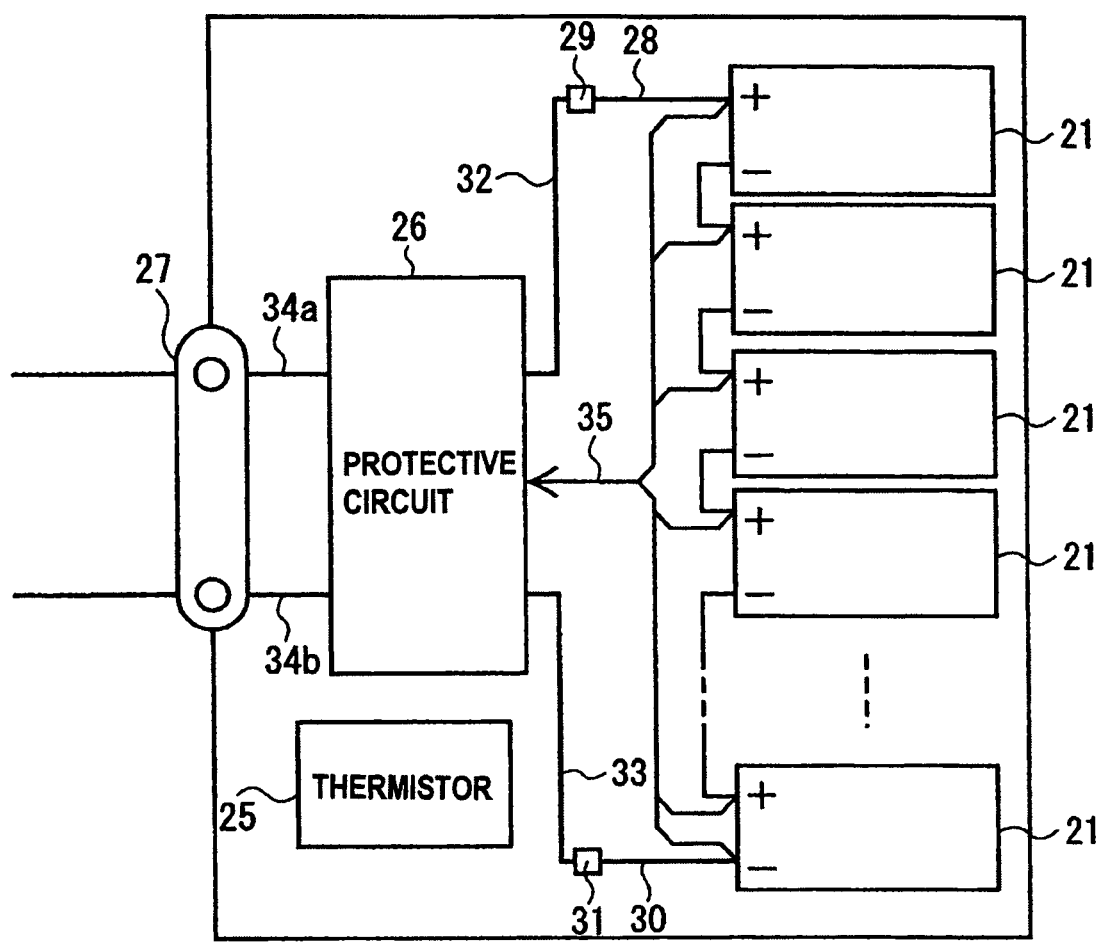
FIG. 6 is a block diagram showing an electrical circuit of the battery pack.

Although the embodiment shown in FIG. 5 and FIG. 6 is one in which cells 21 are serially connected, the cells may be connected in parallel in order to increase battery capacity. It is also possible to connect assembled battery packs serially or in parallel.

The embodiment of the battery pack is appropriately modified according to applications. Preferred applications of the battery pack are ones in which suitability for cycling at a high current is desired. Specific examples thereof include use as a power source for digital cameras and mounting on vehicles such as two- to four-wheeled hybrid electric cars, two- to four-wheeled electric cars, and power-assisted bicycles. For example, the battery pack is preferable for mounting on vehicles.

As stated above, a nonaqueous-electrolyte battery having excellent high-temperature characteristics can be obtained by using a nonaqueous electrolyte containing a mixed solvent prepared by mixing at least two members selected from propylene carbonate (PC), ethylene carbonate (EC), and γ-butyrolactone (GBL) or containing γ-butyrolactone (GBL). A battery pack having a battery assembly including such nonaqueous-electrolyte batteries is especially preferable for mounting on vehicles.

EXAMPLES

The invention will be explained below by reference to Examples. However, various changes can be made therein without departing from the spirit of the invention. The invention should not be construed as being limited to the following Examples.

Example 1

<Production of Positive Electrode>

To N-methylpyrrolidone (NMP) were added 90% by weight lithium-cobalt oxide ($LiCoO_2$) powder as a positive active material, 3% by weight acetylene black and 3% by weight graphite as conductive materials, and 4% by weight poly(vinylidene fluoride) (PVdF). The ingredients were mixed together to obtain a slurry. This slurry was applied to each side of a current collector which was an aluminum foil having a thickness of 15 μm. The slurry applied was dried, and the coated foil was pressed to thereby produce a positive electrode having an electrode density of 3.3 g/cm$^3$ <Production of Negative Electrode>

A spinel lithium titanate ($Li_4Ti_5O_{12}$) powder having an average particle diameter of 0.84 μm, BET specific surface area of 10.8 m$^2$/g, and lithium insertion potential of 1.55 V (vs. Li/Li$^+$) was prepared as a negative active material. The particle diameter of this negative active material was determined with a laser diffraction type distribution analyzer (SALD-300, manufactured by Shimadzu Corp.) by the following method. First, about 0.1 g of a sample was introduced into a beaker together with a surfactant and 1-2 mL of distilled water. The contents were sufficiently stirred, subsequently poured into a water tank being stirred, and examined for intensity distribution of the laser beam 64 times at intervals of 2 seconds. The particle size distribution data were analyzed to determine the average particle diameter.

N-Methylpyrrolidone (NMP) was added to 90% by weight the negative active material, 5% by weight coke burned at 1,300° C. (having a $d_{002}$ of 0.3465 nm, average particle diameter of 8.2 μm, and BET specific surface area of 11.2 m$^2$/g) as a conductive material, and 5% by weight poly(vinylidene fluoride) (PVdF) in such an amount as to result in a solid proportion of 62%. This mixture was kneaded with a planetary mixer, and the solid proportion was gradually lowered by adding NMP to prepare a slurry having a viscosity of 10.2 cP (value measured with a Brookfield viscometer at 50 rpm). This slurry was further mixed by means of a bead mill using zirconia beads having a diameter of 1 mm as a medium.

The slurry obtained was applied to each side of a current collector which was an aluminum foil having a thickness of 15 μm (purity, 99.3%; average crystal grain diameter, 10 μm) The slurry applied was dried, and the coated foil was pressed with rolls heated at 100° C. to thereby obtain a negative electrode.

<Production of Electrode Group>

The positive electrode, a separator made of a porous polyethylene film having a thickness of 25 μm, the negative electrode, and a separator made of the same film were superposed in this order and then spirally wound. The resultant roll was pressed with heating at 80° C. to thereby produce a flat electrode group having a height of 50 mm, width of 33 mm, and thickness of 1.8 mm. The electrode group obtained was packed into a pack made of a laminated film having a three-layer structure including nylon layer/aluminum layer/polyethylene layer and having a thickness of 0.1 mm. The electrode group in the pack was vacuum-dried at 80° C. for 24 hours.

<Preparation of Liquid Nonaqueous Electrolyte>

In a mixed solvent containing ethylene carbonate (EC) and γ-butyrolactone (GBL) (volume ratio, 1:2) was dissolved $LiBF_4$ as an electrolyte material in a concentration of 2.0 mol/L. To the resultant solution were added 0.1 wt. % poly (2-vinylpyridine) and 2 wt % tris(trimethylsilyl)phosphate. Thus, a nonaqueous electrolyte was prepared. This nonaqueous electrolyte had a viscosity at 20° C. of 6.9 cP (measured with a Brookfield viscometer). The poly(2-vinylpyridine) used was one manufactured by Sigma-Aldrich and having an average molecular weight Mw of 37,500.

The liquid nonaqueous electrolyte was injected into the laminated-film pack into which the electrode group had been packed. Thereafter, this pack was completely closed by heat sealing to produce a nonaqueous-electrolyte secondary battery having the structure shown in FIG. 1 and having a width of 35 mm, thickness of 2.0 mm, and height of 65 mm.

Comparative Examples 1 to 7 and Examples 2 to 9

Nonaqueous-electrolyte secondary batteries were produced in the same manner as in Example 1, except that the amounts of the poly(2-vinylpyridine) and tris(trimethylsilyl) phosphate to be added in preparing the nonaqueous electrolyte were changed to the amounts shown in Table 1.

Example 10

A nonaqueous-electrolyte secondary battery was produced in the same manner as in Example 1, except that poly(4-vinylpyridine) was used in place of the poly(2-vinylpyridine) in preparing the nonaqueous electrolyte. The poly(4-vinylpyridine) used was one manufactured by Sigma-Aldrich and having an average molecular weight of 60,000.

Comparative Example 8 and Example 11

Nonaqueous-electrolyte secondary batteries were produced respectively in the same manners as in Comparative Example 1 and Example 1, except that in preparing the nonaqueous electrolytes, the solvent was replaced by a mixed solvent containing ethylene carbonate (EC) and dimethyl carbonate (DMC) (volume ratio, 1:2) and the solute was replaced by 1.5 M $LiPF_6$.

Comparative Example 9 and Example 12

Nonaqueous-electrolyte secondary batteries were produced respectively in the same manners as in Comparative Example 1 and Example 1, except that LiMn$_2$O$_4$ was used in place of the LiCoO$_2$ as a positive active material and that the electrode density was changed to 3.1 g/cm$^3$.

Example 13

A nonaqueous-electrolyte secondary battery was produced in the same manner as in Example 12, except that LiMn$_2$O$_4$ coated with 2 wt % ZrO$_2$ was used as a positive active material.

Example 14

A nonaqueous-electrolyte secondary battery was produced in the same manner as in Example 12, except that LiMn$_2$O$_4$ coated with 2 wt % MgO was used as a positive active material.

Example 15

A nonaqueous-electrolyte secondary battery was produced in the same manner as in Example 12, except that LiMn$_2$O$_4$ coated with 2 wt % B$_2$O$_3$ was used as a positive active material.

Example 16

A nonaqueous-electrolyte secondary battery was produced in the same manner as in Example 12, except that LiMn$_2$O$_4$ coated with 2 wt % Al$_2$O$_3$ was used as a positive active material.

Comparative Examples 10 to 12 and Example 17

Nonaqueous-electrolyte secondary batteries were produced respectively in the same manners as in Comparative Examples 1, 2, and 7 and Example 1, except that TiO$_2$ was used as a negative active material.

Comparative Examples 13 to 16

Nonaqueous-electrolyte secondary batteries were produced respectively in the same manners as in Comparative Examples 10 to 12 and Example 17, except that graphite was used as a negative active material.

The batteries of Examples 1 to 17 and Comparative Examples 1 to 16 were charged to 2.55 V and then allowed to stand in a 60° C. environment for 4 weeks to examine the battery resistance and residual capacity of each battery.

The residual capacity (%) and battery resistance increase (%) are defined by the following equations, and the results obtained are summarized in Table 1.

Residual capacity (%)=[(capacity after storage)/(capacity before storage)]×100

Resistance increase (%)=[(battery resistance after storage)/(battery resistance before storage)−1]×100

TABLE 1

| | Negative active material | Positive active material | Solvent | Solute | First additive | Amount of first additive (wt %) | Second additive | Amount of second additive (wt %) | Residual capacity (%) | Resistance increase (%) |
|---|---|---|---|---|---|---|---|---|---|---|
| Comp. Ex. 1 | Li$_4$Ti$_5$O$_{12}$ | LiCoO$_2$ | EC/GBL (1:2) | 2.0M LiBF$_4$ | — | — | — | — | 58 | 36 |
| Comp. Ex. 2 | Li$_4$Ti$_5$O$_{12}$ | LiCoO$_2$ | EC/GBL (1:2) | 2.0M LiBF$_4$ | poly(2-vinyl-pyridine) | 0.1 | — | — | 62 | 55 |
| Comp. Ex. 3 | Li$_4$Ti$_5$O$_{12}$ | LiCoO$_2$ | EC/GBL (1:2) | 2.0M LiBF$_4$ | poly(2-vinyl-pyridine) | 0.2 | — | — | 67 | 73 |
| Comp. Ex. 4 | Li$_4$Ti$_5$O$_{12}$ | LiCoO$_2$ | EC/GBL (1:2) | 2.0M LiBF$_4$ | poly(2-vinyl-pyridine) | 0.5 | — | — | 67 | 173 |
| Comp. Ex. 5 | Li$_4$Ti$_5$O$_{12}$ | LiCoO$_2$ | EC/GBL (1:2) | 2.0M LiBF$_4$ | — | — | tris(trimethyl-silyl) phosphate | 0.5 | 53 | 36 |
| Comp. Ex. 6 | Li$_4$Ti$_5$O$_{12}$ | LiCoO$_2$ | EC/GBL (1:2) | 2.0M LiBF$_4$ | — | — | tris(trimethyl-silyl) phosphate | 1 | 53 | 27 |
| Comp. Ex. 7 | Li$_4$Ti$_5$O$_{12}$ | LiCoO$_2$ | EC/GBL (1:2) | 2.0M LiBF$_4$ | — | — | tris(trimethyl-silyl) phosphate | 2 | 50 | 18 |
| Ex. 1 | Li$_4$Ti$_5$O$_{12}$ | LiCoO$_2$ | EC/GBL (1:2) | 2.0M LiBF$_4$ | poly(2-vinyl-pyridine) | 0.1 | tris(trimethyl-silyl) phosphate | 2 | 62 | 9 |
| Ex. 2 | Li$_4$Ti$_5$O$_{12}$ | LiCoO$_2$ | EC/GBL (1:2) | 2.0M LiBF$_4$ | poly(2-vinyl-pyridine) | 0.01 | tris(trimethyl-silyl) phosphate | 2 | 60 | 9 |
| Ex. 3 | Li$_4$Ti$_5$O$_{12}$ | LiCoO$_2$ | EC/GBL (1:2) | 2.0M LiBF$_4$ | poly(2-vinyl-pyridine) | 0.05 | tris(trimethyl-silyl) phosphate | 2 | 62 | 9 |
| Ex. 4 | Li$_4$Ti$_5$O$_{12}$ | LiCoO$_2$ | EC/GBL (1:2) | 2.0M LiBF$_4$ | poly(2-vinyl-pyridine) | 0.2 | tris(trimethyl-silyl) phosphate | 2 | 63 | 18 |
| Ex. 5 | Li$_4$Ti$_5$O$_{12}$ | LiCoO$_2$ | EC/GBL (1:2) | 2.0M LiBF$_4$ | poly(2-vinyl-pyridine) | 0.5 | tris(trimethyl-silyl) phosphate | 2 | 70 | 23 |
| Ex. 6 | Li$_4$Ti$_5$O$_{12}$ | LiCoO$_2$ | EC/GBL (1:2) | 2.0M LiBF$_4$ | poly(2-vinyl-pyridine) | 1 | tris(trimethyl-silyl) phosphate | 2 | 77 | 36 |

TABLE 1-continued

| | Negative active material | Positive active material | Solvent | Solute | First additive | Amount of first additive (wt %) | Second additive | Amount of second additive (wt %) | Residual capacity (%) | Resistance increase (%) |
|---|---|---|---|---|---|---|---|---|---|---|
| Ex. 7 | $Li_4Ti_5O_{12}$ | $LiCoO_2$ | EC/GBL (1:2) | 2.0M $LiBF_4$ | poly(2-vinyl-pyridine) | 1 | tris(trimethyl-silyl)phosphate | 5 | 80 | 9 |
| Ex. 8 | $Li_4Ti_5O_{12}$ | $LiCoO_2$ | EC/GBL (1:2) | 2.0M $LiBF_4$ | poly(2-vinyl-pyridine) | 2 | tris(trimethyl-silyl)phosphate | 5 | 83 | 14 |
| Ex. 9 | $Li_4Ti_5O_{12}$ | $LiCoO_2$ | EC/GBL (1:2) | 2.0M $LiBF_4$ | poly(2-vinyl-pyridine) | 3 | tris(trimethyl-silyl)phosphate | 20 | 83 | 12 |
| Ex. 10 | $Li_4Ti_5O_{12}$ | $LiCoO_2$ | EC/GBL (1:2) | 2.0M $LiBF_4$ | poly(4-vinyl-pyridine) | 0.1 | tris(trimethyl-silyl)phosphate | 2 | 62 | 9 |
| Comp. Ex. 8 | $Li_4Ti_5O_{12}$ | $LiCoO_2$ | EC/DMC (1:2) | 1.5M $LiPF_6$ | — | — | — | — | 46 | 40 |
| Ex. 11 | $Li_4Ti_5O_{12}$ | $LiCoO_2$ | EC/DMC (1:2) | 1.5M $LiPF_6$ | poly(2-vinyl-pyridine) | 0.1 | tris(trimethyl-silyl)phosphate | 2 | 58 | 12 |
| Comp. Ex. 9 | $Li_4Ti_5O_{12}$ | $LiMn_2O_4$ | EC/GBL (1:2) | 2.0M $LiBF_4$ | — | — | — | — | 42 | 44 |
| Ex. 12 | $Li_4Ti_5O_{12}$ | $LiMn_2O_4$ | EC/GBL (1:2) | 2.0M $LiBF_4$ | poly(2-vinyl-pyridine) | 0.1 | tris(trimethyl-silyl)phosphate | 2 | 60 | 12 |
| Ex. 13 | $Li_4Ti_5O_{12}$ | $LiMn_2O_4(ZrO_2)$ | EC/GBL (1:2) | 2.0M $LiBF_4$ | poly(2-vinyl-pyridine) | 0.1 | tris(trimethyl-silyl)phosphate | 2 | 70 | 6 |
| Ex. 14 | $Li_4Ti_5O_{12}$ | $LiMn_2O_4(MgO)$ | EC/GBL (1:2) | 2.0M $LiBF_4$ | poly(2-vinyl-pyridine) | 0.1 | tris(trimethyl-silyl)phosphate | 2 | 70 | 6 |
| Ex. 15 | $Li_4Ti_5O_{12}$ | $LiMn_2O_4(B_2O_3)$ | EC/GBL (1:2) | 2.0M $LiBF_4$ | poly(2-vinyl-pyridine) | 0.1 | tris(trimethyl-silyl)phosphate | 2 | 65 | 9 |
| Ex. 16 | $Li_4Ti_5O_{12}$ | $LiMn_2O_4(Al_3O_3)$ | EC/GBL (1:2) | 2.0M $LiBF_4$ | poly(2-vinyl-pyridine) | 0.1 | tris(trimethyl-silyl)phosphate | 2 | 63 | 9 |
| Comp. Ex. 10 | $TiO_2$ | $LiMn_2O_4$ | EC/GBL (1:2) | 2.0M $LiBF_4$ | — | — | — | — | 53 | 50 |
| Comp. Ex. 11 | $TiO_2$ | $LiMn_2O_4$ | EC/GBL (1:2) | 2.0M $LiBF_4$ | poly(2-vinyl-pyridine) | 0.1 | — | — | 53 | 73 |
| Comp. Ex. 12 | $TiO_2$ | $LiMn_2O_4$ | EC/GBL (1:2) | 2.0M $LiBF_4$ | — | — | tris(trimethyl-silyl)phosphate | 2 | 50 | 32 |
| Ex. 17 | $TiO_2$ | $LiMn_2O_4$ | EC/GBL (1:2) | 2.0M $LiBF_4$ | poly(2-vinyl-pyridine) | 0.1 | tris(trimethyl-silyl)phosphate | 2 | 67 | 18 |
| Comp. Ex. 13 | graphite | $LiMn_2O_4$ | EC/GBL (1:2) | 2.0M $LiBF_4$ | — | — | — | 2 | 80 | 64 |
| Comp. Ex. 14 | graphite | $LiMn_2O_4$ | EC/GBL (1:2) | 2.0M $LiBF_4$ | poly(2-vinyl-pyridine) | 0.1 | — | 2 | 40 | 360 |
| Comp. Ex. 15 | graphite | $LiMn_2O_4$ | EC/GBL (1:2) | 2.0M $LiBF_4$ | — | — | tris(trimethyl-silyl)phosphate | 2 | 60 | 260 |
| Comp. Ex. 16 | graphite | $LiMn_2O_4$ | EC/GBL (1:2) | 2.0M $LiBF_4$ | poly(2-vinyl-pyridine) | 0.1 | tris(trimethyl-silyl)phosphate | 2 | 20 | 600 |

It can be seen that the batteries of the Examples are reduced in self-discharge amount and also in battery resistance change. These batteries proved to have a long life. It can also be seen that the batteries employing the electrolytes containing γ-butyrolactone are reduced in self-discharge amount and in resistance increase. Furthermore, it can be seen that the batteries employing the positive active materials which have undergone a coating treatment are reduced in self-discharge amount and in resistance increase.

It can be seen that the batteries of the Comparative Examples are inferior in battery characteristics.

With respect to the batteries of Comparative Examples 13 to 16, which employ graphite as a negative active material, it is apparent that the addition of poly(2-vinylpyridine) or tris(trimethylsilyl)phosphate produces no effect at all.

Although embodiments of the invention were explained above, the invention should not be construed as being limited thereto and various modifications thereof are possible within the scope of the invention described in the claims. In practicing the invention, various modifications of the invention are possible without departing from the spirit of the invention. Furthermore, by suitably combining two or more of constituent elements disclosed in the embodiments, various inventions can be achieved.

What is claimed is:

1. A nonaqueous-electrolyte battery, comprising:
   a case,
   a positive electrode held in the case,
   a negative electrode held in the case and comprising a negative active material which undergoes lithium insertion/release at a potential higher than 1.0 V, and a nonaqueous electrolyte packed in the case, wherein the nonaqueous electrolyte comprises a nonaqueous solvent and an electrolyte material dissolved in the nonaqueous solvent, wherein the nonaqueous solvent comprises at least one compound (a) selected from the group consisting of poly(2-vinylpyridine) and poly(4-vinylpyridine) and at least one compound compound (b) is at least one compound selected from the group consisting of tris(trimethylsilyl)phosphate, bis(trimethylsilyl)methyl phosphate, dimethyl trimethylsilyl phosphate and a phosphate comprising at least one functional group represented by the formula (3):

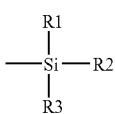
(3)

wherein R1 to R3 each independently represent an alkyl group having 1-10 carbon atoms, an alkenyl group having 2-10 carbon atoms, or an aryl group having 6-10 carbon atoms, wherein a content of the at least one compound (a) is from 0.01% to 3% by weight based on the total weight of the nonaqueous electrolyte, and wherein a content of the at least one compound (b) is from 0.1% to 20% by weight based on the total weight of the nonaqueous electrolyte.

2. The battery of claim 1, wherein the negative active material is a lithium-titanium composite oxide.

3. The battery of claim 2, wherein the lithium-titanium composite oxide has a spinel structure.

4. The battery of claim 1, wherein the nonaqueous solvent further comprises a solvent prepared by mixing two or more members selected from the group consisting of propylene carbonate, ethylene carbonate, and γ-butyrolactone.

5. The battery of claim 1, wherein the nonaqueous solvent further comprises γ-butyrolactone.

6. The battery of claim 1, wherein the positive electrode comprises a lithium-transition metal composite oxide containing manganese.

7. The battery of claim 1, wherein the positive electrode comprises a lithium-transition metal composite oxide and has an oxide of at least one element selected from the group consisting of Al, Mg, Zr, B, Ti, and Ga on part of the surface of the composite oxide.

8. A battery assembly comprising nonaqueous-electrolyte batteries connected together in an electrically serial or parallel arrangement, wherein each of the nonaqueous-electrolyte batteries is the battery of claim 1.

9. The assembly of claim 8, which is equipped with a protective circuit capable of detecting the voltage of each battery.

10. The battery of claim 1, wherein the content of the at least one compound (a) is from 0.01% to 1% by weight based on the total weight of the nonaqueous electrolyte.

11. The battery of claim 1, wherein the content of the at least one compound (a) is from 0.03% to 1% by weight based on the total weight of the nonaqueous electrolyte.

12. The battery of claim 1, wherein the content of the at least one compound (b) is from 0.01% to 10% by weight based on the total weight of the nonaqueous electrolyte.

13. The battery of claim 1, wherein the content of the at least one compound (b) is from 0.5% to 5% by weight based on the total weight of the nonaqueous electrolyte.

* * * * *